Aug. 11, 1964     T. S. R. TORELV     3,143,753
WINDSHIELD WIPER AND WASHER ASSEMBLY
Filed Feb. 18, 1963     2 Sheets-Sheet 1
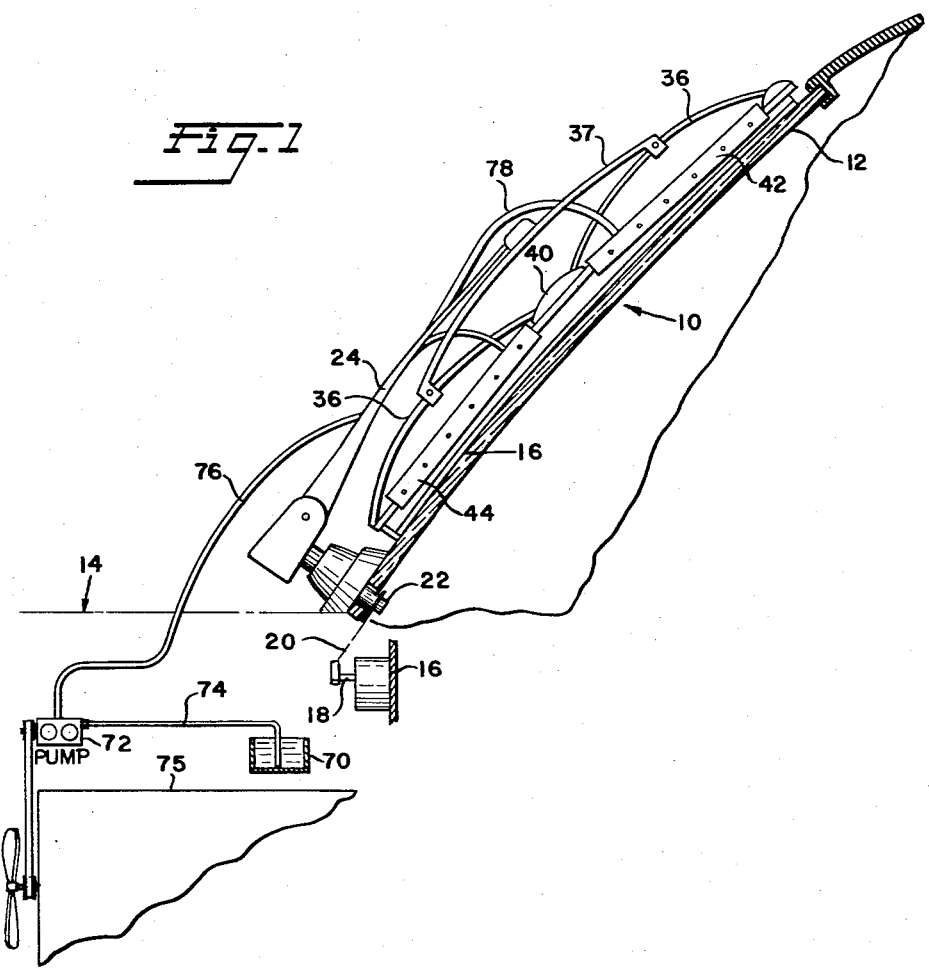
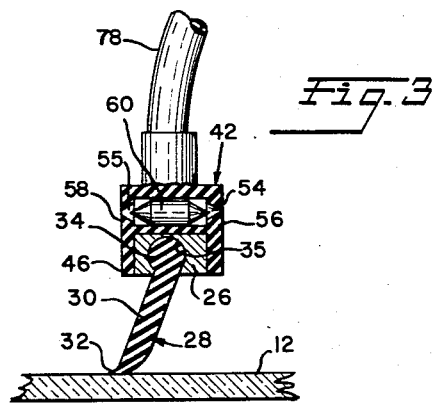
INVENTOR
TORE S. TORELV
BY *Strauch, Nolan & Neale*
ATTORNEYS Aug. 11, 1964 T. S. R. TORELV 3,143,753
WINDSHIELD WIPER AND WASHER ASSEMBLY
Filed Feb. 18, 1963 2 Sheets-Sheet 2

INVENTOR
TORE S. TORELV

BY Strauch, Nolan & Neale
ATTORNEYS

United States Patent Office 3,143,753
Patented Aug. 11, 1964

3,143,753
WINDSHIELD WIPER AND WASHER ASSEMBLY
Tore Samuel Rune Torelv, Kungsholmsstrand 181,
Stockholm, Sweden
Filed Feb. 18, 1963, Ser. No. 259,267
1 Claim. (Cl. 15—250.04)

The present invention relates to windshield cleaning systems and more particularly to improvements in an automotive windshield wiper and washer assembly of the type that directs cleaning liquid onto the windshield only in the direction of movement of the wiper.

One of the principal disadvantages of conventional and commercially available windshield wiper and washer assemblies is that the stream of washing liquid strikes only one localized region on the windshield, the location of which is usually dependent upon the speed of the vehicle. The stream of washing liquid is directed by such conventional windshield washing devices so that it impinges against not only the dirty portion of the windshield which is in front of the drying edge of the wiper in its direction of motion, but also on the wiped portion of the windshield which is to the rear of the wiped edge. As a consequence, while cleaning liquid is being applied, the windshield on one side of the wiper will be covered with a mixed layer of dirt and cleaning liquid and the windshield on the other side of the wiper will be covered with a layer of liquid, thus obscuring the driver's vision on both sides of the wiper.

In an effort to overcome the foregoing disadvantages, it has been generally proposed to deliver the cleaning liquid in a fluid conduit to the vicinity of the wiping edge of the windshield wiper blade and to discharge the cleaning liquid from the conduit in such a manner that the liquid will always be directed to the front of the wiping edge of the blade in its direction of motion. This type of construction requires oppositely directed discharged openings which are alternately closed and opened depending upon the direction of movement of the wiper so as to prevent the liquid from striking the portion of the windshield that has already been wiped.

The provision of one discharge opening on each side of the wiper blade, however, has been found to be ineffective for adequately cleaning the windshield. When several openings are provided on each side of the blade member with this type of construction, appreciable difficulty was encountered in simultaneously opening and closing each set of openings on each side of the wiper. This, it was found, is due to the fact that dirt is deposited along the blade so that the surface thereof is no longer sufficiently uniform to insure the simultaneously closing of the several discharge openings on each side. Also, the material of which the blade is made becomes less elastic and flexible with time thus creating a further condition in which the wiper is unable to simultaneously close the discharge openings on each side thereof.

The present invention overcomes these disadvantages by controlling each pair of oppositely facing discharge openings with a valve member which operates on the principle of inertia in response to the oscillatory movement of the wiper to permit cleaning liquid to be discharged only in direction of movement of the wiper as it is rocked back and forth. With this construction, according to the present invention, several discharge openings on each side of the wiper are opened and closed simultaneously and are spaced longitudinally along the wiper to uniformly distribute cleaning fluid over the outer surface of the windshield, thus assuring for a more rapid, reliable and efficient cleaning operation.

It is, therefore, the major object of the present invention to provide for a novel windshield wiper and washing assembly which directs cleaning liquid only in the direction of wiper movement and which is more effective and reliable than prior art constructions.

More specifically, an object of the present invention resides in the provision of a windshield wiper and washer assembly having a plurality of uniformly spaced discharge nozzle openings on each side of the wiper with each oppositely facing pair of discharge openings being under the control of an inertia actuated valve member which is responsive to the oscillatory movement of the wiper to permit only one discharge nozzle opening of each pair to be opened at a time for directing fluid only in the direction of movement of the wiper blade.

Further objects of the invention will appear as the description proceeds in connection with the appended claims and the annexed drawings wherein:

FIGURE 1 is a side elevation of the washer and wiper assembly according to the present invention and illustrating the cleaning liquid reservoir and pump essentially in diagrammatic form;

FIGURE 3 is a cross sectional view taken substantially along lines 3—3 of FIGURE 2.

Figure 2:
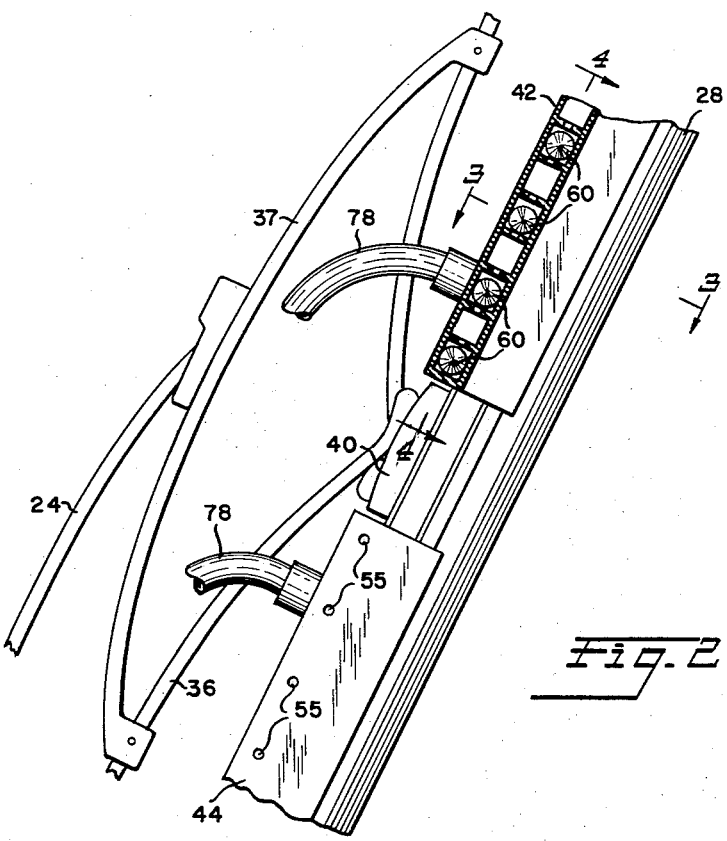
FIGURE 2 is an enlarged fragmentary side elevation of the wiper assembly illustrated in FIGURE 1.

Referring now to the drawings herein showing the construction according to a preferred embodiment of the present invention, the reference numeral 10 generally designates a washer and wiper assembly for a windshield 12 of an automotive vehicle 14. Washer and wiper assembly 10 comprises a conventional wiper motor 16 suitably mounted on the fire wall of vehicle 14 and having a rotary output shaft 18 connected by a linkage 20 to a wiper arm drive or rockshaft 22 for imparting ocillatory movement thereto.

Drive shaft 22 is conventionally journaled in the cowl of vehicle 14 in the vicinity of the lower edge of windshield 12. Conventionally fixed to the outer end of shaft 22 is a standard wiper arm 24 which carries an elongated wiper blade mounting member 26. Mounting member 26 carries a wiper blade 28 which is of elastic, resilient material, such as rubber, and comprises a squeegee 30 having a wiping lip 32 which is adapted to lie against windshield 12 and a retention bead portion 34 matingly received and secured in a groove 35 formed in mounting member 26. Groove 35 generally extends the entire length of blade 28. The wiping lip 32 of wiper blade 28 is pressed firmly against windshield 12 by means of standard flexible biasing members 36 and 37 in a conventional manner such that pressure is applied to wiper blade 28 to cause it to deform slightly in the manner shown in FIGURE 3.

Since motor 16, linkage 20, shaft 22, wiper arm 24 and members 36 and 37 are all of conventional construction, these elements accordingly will not be further described.

As shown, members 36 are mounted on the outer ends of member 37 which is secured at its midregion to arm 24.

Members 36 are secured at their outer ends to mounting member 26 and at their inner ends to a bridge member 40. Bridge member 40 is secured to member 26 midway between the ends thereof. Member 26 mounts a pair of longitudinally aligned cleaning liquid manifold and distribution members 42 and 44 each having a channel shaped portion 46 matingly receiving member 26. Member 42 extends substantially the entire length between the upper end of mounting member 26 and bridge member 40 and member 44 extends substantially the entire length between the lower end of member 26 and bridge member 40.

The upper portion of member 42 overlying mounting member 26 is formed with a chamber 48 having a generally rectangular cross section and extending longitudinally of mounting member 26 and wiper blade 28. Chamber 48 is divided into a series of uniformly dimensioned compartments 52 by means of parallel apertured partitions 53. Compartments 52 are uniformly spaced longitudinally with respect to the wiper subassembly of member 26 and wiper blade 28. Each compartment 52 is formed with axially aligned nozzle openings 54 and 55 respectively disposed in opposite parallel side walls 56 and 58 of member 42. The common axes of the pairs of oppositely facing nozzle openings 54 and 55 illustrated are parallel with each other and extend substantially at right angles to the longitudinal axis of the wiper subassembly of mounting member 26 and wiper blade 28. The construction of member 44 is the same as that of member 42 with like reference numerals identifying like parts.

Disposed in each compartment 52 is a shuttle valve member 60 which is preferably of one piece construction having axially opposed conical end sections 62 and 64 joined by a cylindrical center portion 66. Sections 62 and 64 are adapted to seatingly engage in nozzle openings 54 and 55 respectively. Openings 54 and 55 preferably are of tapered contour to matingly interfit with section 62 and 64.

Figure 4:
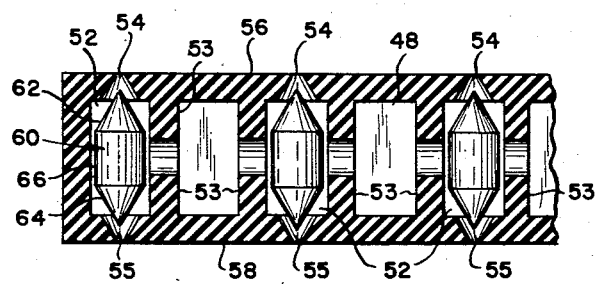
FIGURE 4 is a cross sectional view taken substantially along lines 4—4 of FIGURE 2.

As best shown in FIGURES 3 and 4, the axial length of each valve member 60 is smaller by a predetermined magnitude than the axial distance between nozzle openings 54 and 55 extending along the common nozzle axis so that when valve member 60 is shifted along the common nozzle axis to one extreme position transversely of the wiper blade 26, it will seat in and close nozzle opening 55 and open nozzle opening 54. When valve member 60 is shifted in the opposite direction, section 62 seats in nozzle opening 54 to close this opening and nozzle opening 55 is opened.

Each valve member 60 is guided for axial movement extending along an axis aligning with the common axis of nozzle openings 54 and 55 by the wall portions of member 42 including partitions 53 which extend at right angles to the subassembly of member 26 and wiper blade 28.

The transverse dimensions of each compartment 52 and the valve member 60 taken at right angles to the common axis of nozzle openings 54 and 55 in each compartment in such that valve member 60 is permitted to slide freely back and forth along the common nozzle axis under a force attributable to its own inertia as the wiper assembly is oscillated back and forth under the power supplied by wiper motor 16.

Cleaning liquid is supplied to chambers 48 of members 42 and 44 from a reservoir 70 connected to the inlet of a small pump 72 by a fluid conduit 74. Pump 72 may be suitably belt driven from the engine of the vehicle 14 indicated at 75. The outlet of pump 72 is connected by a main conduit 76 and branch conduits indicated at 78 to chambers 48 of manifold members 42 and 44 respectively. Actuation of pump 72, therefore, will furnish cleaning liquid to all of the compartments 52 in each of the partitioned chambers 48 of members 42 and 44 through the apertures in the transverse partition walls 53.

Arm 24 together with member 26 and wiper blade 28 is in a generally horizontal position before wiper motor 16 is energized to set the wiper assembly in motion. In this generally horizontal inoperative position, the nozzle openings 55 of manifold members 42 and 44 face downwardly with valve members 60 being seated in nozzle openings 55 owing to their own weight. As a result, the upwardly directed nozzle openings 54 in members 42 and 44 will be open.

Consequently, only those nozzle openings 54 facing in the direction which the wiper assembly will begin to move are open. When wiper motor 16 is actuated to initiate movement of the wiper assembly from its generally horizontal inoperative rest position, the inertia acting on valve member 60 as a result of accelerating the wiper assembly from a zero velocity to a predetermined angular velocity will cause valve members 60 to seat more firmly in nozzle openings 55. Thus, the cleaning liquid supplied by actuation of pump 72 will be discharged only through nozzle openings 54 to direct uniformly spaced streams of cleaning liquid in the direction of movement of the wiper assembly.

After the wiper assembly reaches its extreme far position opposite from the initial horizontal rest position and begins its reverse stroke in the oscillation of shaft 22, valve members 60, under their inertia, will axially shift simultaneously to seat in nozzle openings 54, thus leaving nozzle openings 55 open. As a consequence, cleaning liquid, on the reverse stroke of the wiper assembly, will be directed only from nozzle openings 55 in the direction of movement of the wiper assembly.

As best shown in FIGURE 3, the direction of the streams being emitted either from the set of nozzle openings 54 on one side of the wiper assembly or from the set of nozzle openings 55 on the other side of the wiper assembly will be directed essentially at right angles to the longitudinal axis of wiper blade 28. As a result, cleaning liquid will strike only that portion of the windshield in front of the wiping lip 32 in the direction of movement of wiping blade 28, thus leaving the wiped portion of the windshield free of any vision distorting unwiped layers of cleaning liquid.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

A cleaning and wiping apparatus for an automotive windshield comprising:
 (a) a rockably mounted wiper arm,
 (b) means for operating said wiper arm,
 (c) wiper blade holding means carried by said arm and having a channel opening inwardly toward said windshield,
 (d) a flexible wiper blade secured to said holding means and extending longitudinally through said channel for oscillatory wiping engagement with said windshield,
 (e) means providing an elongated fluid chamber in said holding means, said chamber overlying said channel and extending longitudinally of said wiper blade,
 (f) a plurality of axially spaced nozzle openings formed in said holding means on each side of said blade in fluid communication with said chamber, each nozzle opening on one side of said blade facing oppositely from and axially aligning with a nozzle opening on the opposite side of said blade along a common axis extending transversely of said blade,
 (g) each nozzle opening being formed with a seat substantially contained in a conical envelope,
 (h) means for furnishing a supply of liquid to said chamber, (i) a plurality of valve closure members carried by said holding means and each being disposed in said chamber for limited axial displacement between a pair of aligned nozzle openings and having conical end sections co-operating with the seats of aligned nozzle openings, (j) each valve closure member being shiftable by its own inertia along the common axis of the associated pair of aligned nozzle openings in response to oscillatory movement of said arm to close only a predetermined one of the associated pair of aligned openings at a time for permitting liquid from said chamber to be discharged only in the direction of movement of said wiper blade, (k) said holding means having transverse apertured partitions separating aligned pairs of said nozzle openings, and each closure member having a cylindrical section joining said end sections and being slidably received in the compartments formed by said partition.

References Cited in the file of this patent

UNITED STATES PATENTS

| | | |
|---|---|---|
| 2,582,717 | Pierce | Jan. 15, 1952 |
| 2,763,023 | Horton | Sept. 18, 1956 |